Apr. 3, 1923. 1,450,706
C. L. ANDERSON
UNIVERSAL JOINT
Filed Mar. 25, 1921
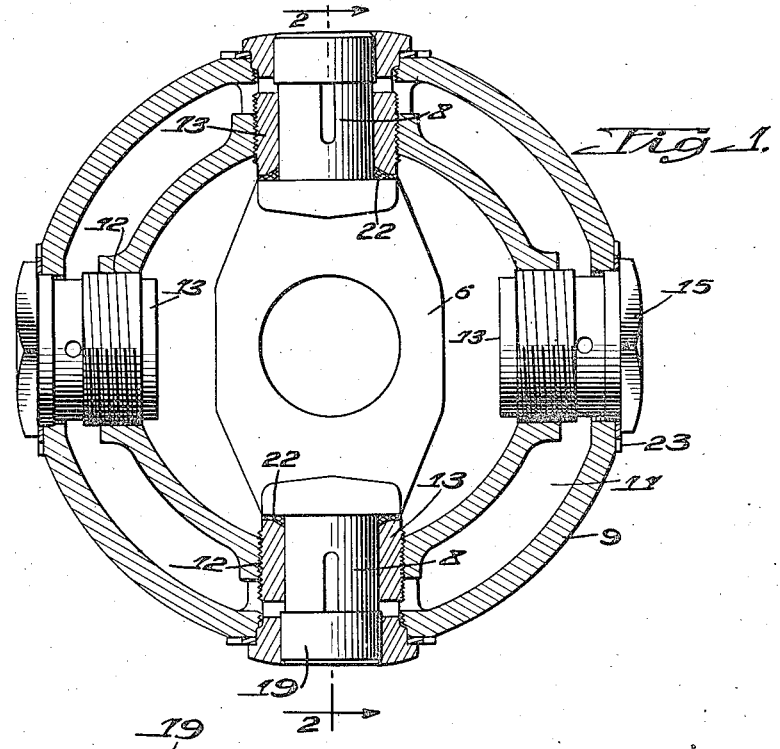
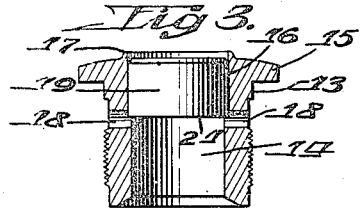
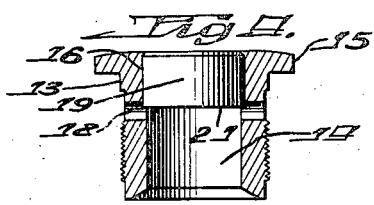
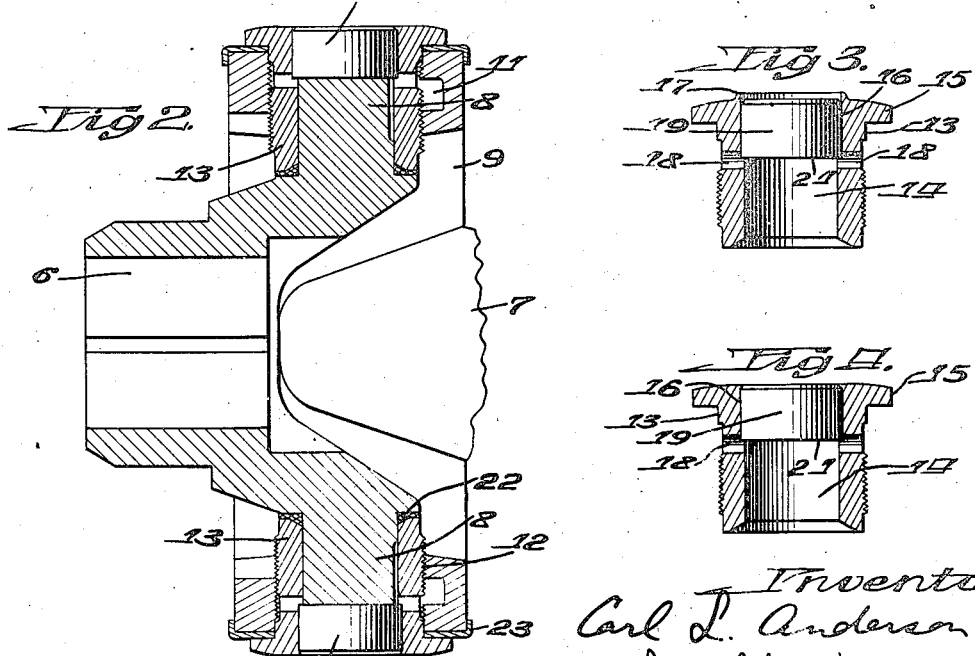

Patented Apr. 3, 1923.

1,450,706

UNITED STATES PATENT OFFICE.

CARL L. ANDERSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL E. SWENSON, ALL OF ROCKFORD, ILLINOIS.

UNIVERSAL JOINT.

Application filed March 25, 1921. Serial No. 455,609.

*To all whom it may concern:*

Be it known that I, CARL L. ANDERSON, a citizen of the United States, residing at Rockford, in the county of Winnebago and State of Illinois, have invented certain new and useful Improvements in Universal Joints, of which the following is a specification.

This invention relates to universal joints of the trunnion type characterized by a pair of terminal coupling members, a transmission member and trunnion connections between said members, and has for one of its objects the provision of a novel trunnion connector unit so constructed as to permit economy in production and durability in use.

More particularly, I have aimed to provide an individual trunnion connector unit for each trunnion, comprising a bearing cap adapted to be threadingly secured in operative position and which has a through bore providing radial bearing for its trunnion, and is equipped with a hardened steel plug secured in the outer end of said bore, providing a very efficient end thrust bearing for the outer end of the trunnion.

My invention also contemplates as an object, the provision in a universal joint of the trunnion type, of a novel form of end thrust bearing for each trunnion, consisting preferably of a plug or disk structurally independent of each trunnion bearing and sepcured at the outer end thereof by constricting the metal about each bearing member to permanently secure it in operative position, as explained more fully hereinafter.

Other objects and attendant advantages will be appreciated by those familiar with this art as the invention becomes better understood by reference to the following description when considered in connection with the accompanying drawings, in which—

Figure 1 is a transverse sectional view through a universal joint embodying my invention, with the trunnion member for the trunnion caps shown in the horizontal position, removed;

Fig. 2, a longitudinal sectional view taken substantially on the line 2—2 of Fig. 1;

Fig. 3, a sectional view through a trunnion connector unit, showing the parts in the course of assembly; and Fig. 4, a sectional view of said connector unit completed.

Referring now more particularly to the drawings, it will be observed that in illustrating the present invention I have taken as an example, a trunnion type universal joint of the kind in which the trunnions are formed at the ends of the terminal members and in which the transmission member is in the form of an annular housing. The terminal members designated generally by 6 and 7, each terminate in a pair of opposed co-axial trunnions 8, these parts being preferably forgings, hardened, the trunnions being ground to finish on their peripheral and end surfaces. The transmission housing 9 may be of any suitable or preferred construction and at present is in one piece, having an annular lubricant reservoir 11 formed by a one-piece core, as disclosed in application Serial No. 387,272. The transmission housing is quarteringly bored to provide radial openings 12 intersecting the lubricant reservoir 11; and these openings are threaded for the reception of trunnion-connector bearing units designated generally by 13.

Each bearing unit consists of a steel body having a through bore 14 and shaped to provide a hexagonal head 15 or the equivalent. The shank of the body is exteriorly threaded to fit the threaded openings 12. It will be observed that the outer end 16 of the bore 14 is of slightly larger diameter than the inner end, and that the outer end of the body is shaped to provide a raised edge 17, contiguous to the bore. Suitable lubricant holes as 18 may be drilled through the body connecting the lubricant reservoir with both the radial and end thrust bearing surfaces which will be presently described. After the body has been suitably hardened, the bore 14 will be ground to size, providing a finished bearing surface. A hardened steel plug 19 will now be pressed into the bore 16 until limited by the shoulder at its bottom. The body portion 17 will be forced or swaged into the space provided by the chamfered outer end of the plug 19, thus permanently securing the plug in the cap. The outer end of the cap and plug will then be finished flush as by grinding. It will be observed that the foregoing provides an exceptionally simple and inexpensive method of constructing a trunnion bearing unit, and at the same time assures accuracy and precision in the radial and end thrust trunnion bearing surfaces formed respectively by the bore 14 and the inner end 21 of the plug 19. These surfaces are suitably grooved for distribution of oil from the holes 18.

While the foregoing illustrates a single example of that phase of my invention respecting the end thrust bearing for the trunnions, it will be observed that this feature is of general application to universal joints of the trunnion type. It is characterized by the fact that the end thrust bearing member, plug or disk as it may be termed, is structurally independent of the cylindrical bearing for the trunnion and is secured in position at the outer end of its trunnion by constricting the metal of its supporting or contiguous wall in any of various ways, such for example as by compressing, swaging or rolling such metal inwardly over or against said member to permanently secure it in operative position. It will be understood, therefore, that this feature of my invention is in no way limited to the particular mode of application or to the particular species of trunnion type universal joint herein disclosed.

Suitable packing 22 is interposed between the inner end of each bearing unit and the adjoining shoulder on the terminal, so that when the bearing units are screwed in sufficiently to bring the end thrust surfaces 21 against the outer ends of the trunnions, the inner ends of the trunnion bearings will be effectually sealed, providing an oil and dust proof structure. Any suitable lock nut means such as plates 23, may be employed for preventing displacement of the bearing units.

It is believed that the foregoing conveys a clear understanding of the objects prefaced above, and while I have illustrated and described but a single application of my invention, it should be understood that it may be embodied in any trunnion type universal joint, and that changes might be made in details of construction without departing from the spirit and scope of the invention as expressed in the appended claims, in which—

I claim:

1. In a universal joint, the combination with terminal coupling members and a transmission member, of trunnion connections between said members, each comprising an exteriorly threaded bearing cap having a through bore providing radial bearing for its trunnion, and a hardened metallic plug secured in the outer end of said bore, providing a bearing complemental to the outer end of said trunnion for taking the end thrust thereof.

2. In a universal joint, the combination with coupling members and a transmission member, of trunnion connections between said members, and bearings for said trunnions, each comprising an exteriorly threaded body threadingly connected with one of said members and having a through bore providing radial bearing for its trunnion, and a bearing member secured to said body in the outer end of said bore and providing a bearing surface complemental to the outer end of its trunnion for taking the end thrust thereof.

3. In a universal joint, a trunnion bearing unit comprising an exteriorly threaded body having a hexagonal head or the equivalent and a through bore, the end of which adjacent to said head is of larger diameter than the opposite end, the head shaped to provide a raised portion contiguous to the bore, and a hardened steel plug having a press fit in the larger bore and secured therein by pressing said raised portion of the head into the space afforded by the chamfered outer end of the plug.

4. In a universal joint, the combination of a pair of terminal coupling members, a transmission housing having an oil reservoir, means for connecting the terminal members and transmission housing comprising trunnions and bearing bodies for trunnions, each bearing body having a through bore providing radial bearing for its trunnion and having a hardened steel bearing plug secured in the outer end of said bore providing a bearing complemental to the outer end of said trunnion for taking the end thrust thereof, each body being exteriorly threaded and adapted to be screwed into operative position, and means providing oil communication between the lubricant reservoir and the radial and end thrust trunnion bearing surfaces.

5. In a universal joint, the combination with coupling members and a transmission member, of trunnion connections between said members, and bearings for said trunnions, each comprising an exteriorly threaded body threadingly connected with one of said members and having a through bore providing radial bearing for its trunnion, a bearing member secured to said body in the outer end of said bore and providing a bearing surface complemental to the outer end of its trunnion for taking the end thrust thereof, and a packing between the inner end of said radial bearing and the adjacent end of its trunnion.

6. In a universal joint of the trunnion type, the combination with coupling means, transmission means and trunnions for connecting the same, of a member at the outer end of each trunnion providing an end thrust bearing therefor, each bearing member being held in position by constriction of its supporting wall.

7. A universal joint comprising coupling members, a transmission member, trunnions connecting said members, and a plug providing an end thrust bearing for each trunnion and retained in position by metal pressed inwardly over the outer marginal portion of the plug.

8. In a universal joint of the trunnion type, the combination with coupling members and a transmission member, of trunnions connecting said members, a member providing an end thrust bearing for the outer end of such trunnion and being structurally independent of the cylindrical bearing for such trunnion, and means for securing each bearing member in position by constricting the contiguous wall thereabout.

CARL L. ANDERSON.